US012682024B2

(12) United States Patent
Hwang

(10) Patent No.: US 12,682,024 B2
(45) Date of Patent: **\*Jul. 14, 2026**

(54) METHOD AND SYSTEM FOR AUTHENTICATING USER CONTENT

(71) Applicant: Piamond Corp., Busan (KR)

(72) Inventor: Doo Geon Hwang, Busan (KR)

(73) Assignee: PIAMOND CORP., Busan (KR)

( \* ) Notice: Subject to any disclaimer, the term of this patent is extended or adjusted under 35 U.S.C. 154(b) by 34 days.

This patent is subject to a terminal disclaimer.

(21) Appl. No.: 18/793,082

(22) Filed: Aug. 2, 2024

(65) Prior Publication Data

US 2024/0394347 A1     Nov. 28, 2024

Related U.S. Application Data

(63) Continuation of application No. 18/535,390, filed on Dec. 11, 2023, now Pat. No. 12,086,219.

(30) Foreign Application Priority Data

Dec. 12, 2022     (KR) ........................ 10-2022-0172872
Dec. 5, 2023     (KR) ........................ 10-2023-0174803

(51) Int. Cl.
*G06F 21/16*          (2013.01)
*G06F 21/31*          (2013.01)
*G06V 40/20*          (2022.01)

(52) U.S. Cl.
CPC ............ *G06F 21/16* (2013.01); *G06F 21/316* (2013.01); *G06V 40/20* (2022.01)

(58) Field of Classification Search
CPC .......... G06F 21/16; G06F 21/30; G06F 21/31; G06F 21/316; G06V 40/20
See application file for complete search history.

(56) References Cited

U.S. PATENT DOCUMENTS

| | | | | |
|---|---|---|---|---|
| 8,839,118 | B2 * | 9/2014 | Gavade ................ | G11B 27/034 |
| | | | | 382/229 |
| 8,972,726 | B1 * | 3/2015 | Poling ................ | H04L 63/0428 |
| | | | | 713/168 |
| 10,339,281 | B2 * | 7/2019 | Cholas ................. | H04L 63/102 |
| 10,356,095 | B2 * | 7/2019 | Meyer .................... | H04L 51/08 |
| 11,379,570 | B2 * | 7/2022 | Jammalamadaka .. | G06F 1/1626 |
| 12,086,219 | B2 * | 9/2024 | Hwang ................. | G06F 21/316 |
| 2023/0362149 | A1 * | 11/2023 | Song ..................... | H04L 63/08 |
| 2024/0037163 | A1 * | 2/2024 | Parker .................... | G06F 9/451 |

\* cited by examiner

*Primary Examiner* — Hosuk Song
(74) *Attorney, Agent, or Firm* — ArentFox Schiff LLP; Joseph M. Maraia

(57) ABSTRACT

Disclosed is a method and system for authenticating user content authentication. A user content authentication method according to an example embodiment may include authenticating a user that desires to create user content, verifying that the user is directly writing the user content, and creating authentication information on the user content created by the user when it is verified that the user is directly writing the user content.

10 Claims, 12 Drawing Sheets

FIG. 6

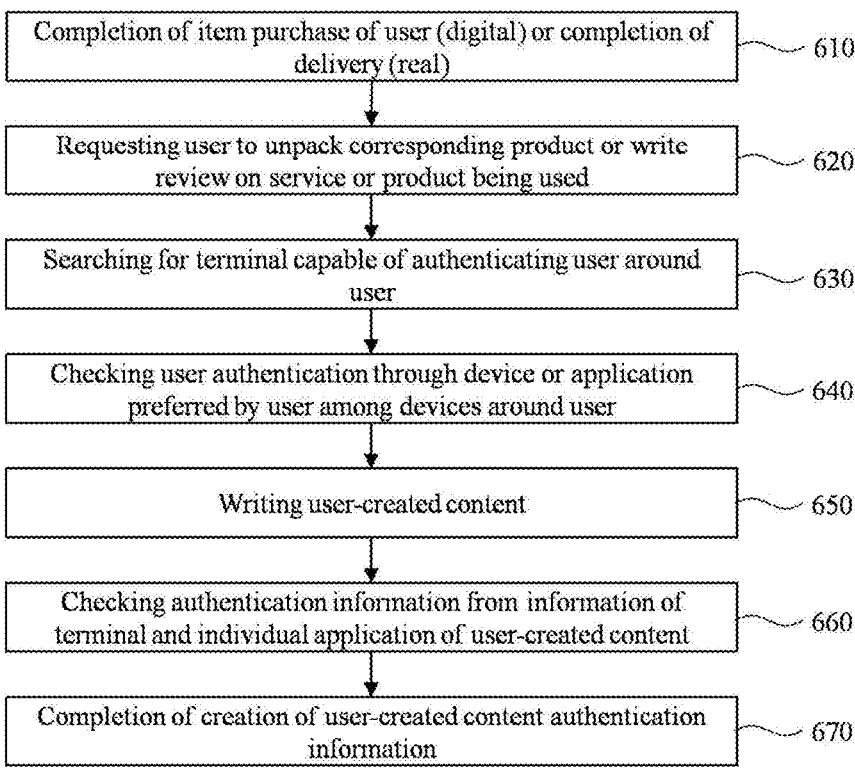

Completion of item purchase of user (digital) or completion of delivery (real) — 610

Requesting user to unpack corresponding product or write review on service or product being used — 620

Searching for terminal capable of authenticating user around user — 630

Checking user authentication through device or application preferred by user among devices around user — 640

Writing user-created content — 650

Checking authentication information from information of terminal and individual application of user-created content — 660

Completion of creation of user-created content authentication information — 670

Purchase details

Item#1    Review

Item#2    Review

Item#3    Review

Purchase history of user

Peripheral devices of user
(used for authentication and content creation)

FIG. 8

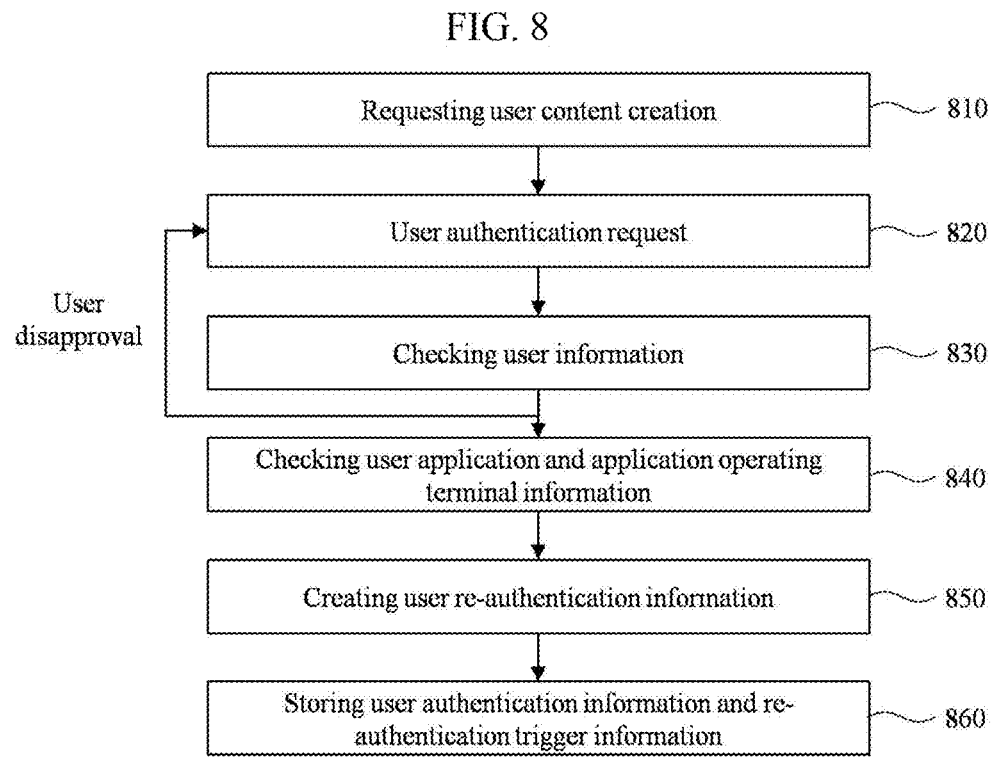

| Requesting user content creation | — 810 |

| User authentication request | — 820 |

User
disapproval

| Checking user information | — 830 |

| Checking user application and application operating terminal information | — 840 |

| Creating user re-authentication information | — 850 |

| Storing user authentication information and re-authentication trigger information | — 860 |

FIG. 10

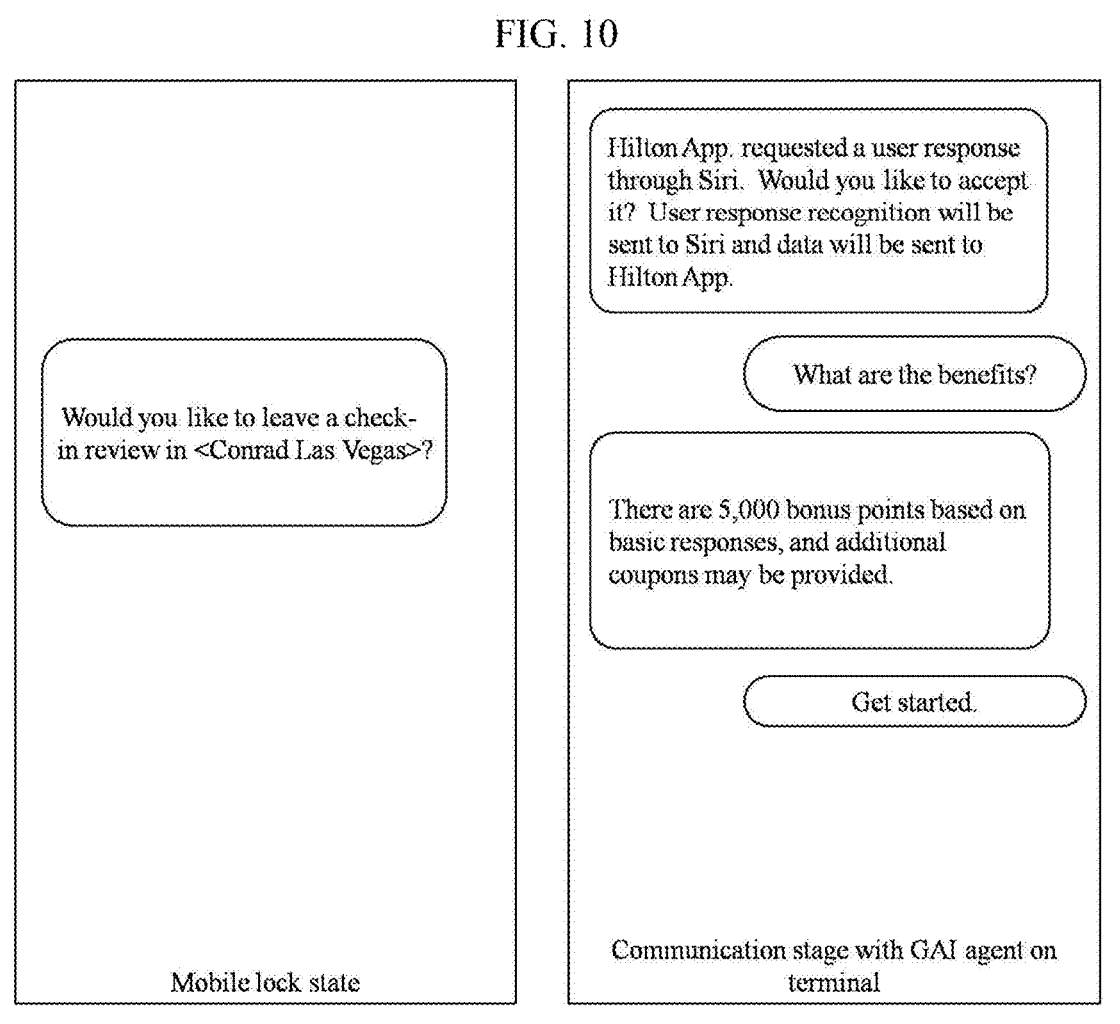

Would you like to leave a check-in review in <Conrad Las Vegas>?

Mobile lock state

Hilton App. requested a user response through Siri. Would you like to accept it? User response recognition will be sent to Siri and data will be sent to Hilton App.

What are the benefits?

There are 5,000 bonus points based on basic responses, and additional coupons may be provided.

Get started.

Communication stage with GAI agent on terminal

FIG. 11

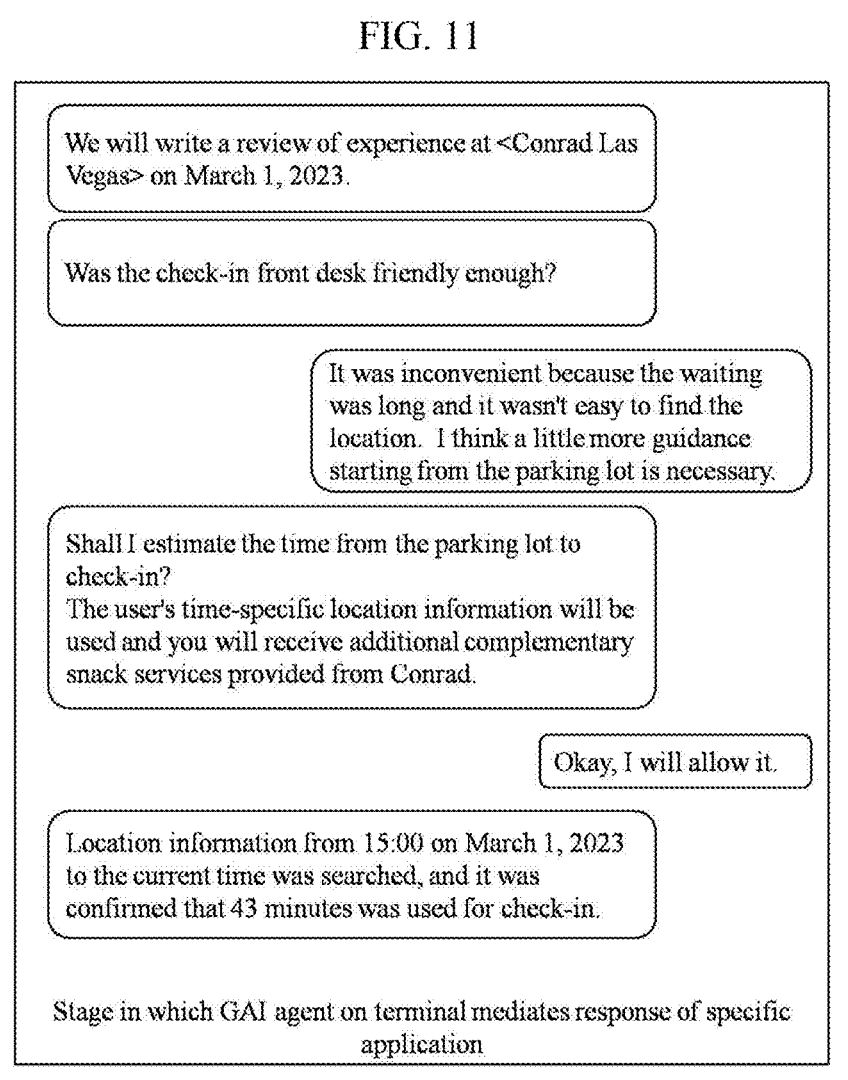

We will write a review of experience at <Conrad Las Vegas> on March 1, 2023.

Was the check-in front desk friendly enough?

It was inconvenient because the waiting was long and it wasn't easy to find the location. I think a little more guidance starting from the parking lot is necessary.

Shall I estimate the time from the parking lot to check-in?
The user's time-specific location information will be used and you will receive additional complementary snack services provided from Conrad.

Okay, I will allow it.

Location information from 15:00 on March 1, 2023 to the current time was searched, and it was confirmed that 43 minutes was used for check-in.

Stage in which GAI agent on terminal mediates response of specific application

METHOD AND SYSTEM FOR AUTHENTICATING USER CONTENT

CROSS-REFERENCE TO RELATED APPLICATIONS

This application is a continuation of U.S. patent application Ser. No. 18/535,390 filed on Dec. 11, 2023, entitled METHOD AND SYSTEM FOR AUTHENTICATING USER CONTENT, which in turn claims the benefit of priority under 35 U.S.C. § 119 to Korean Patent Application No. 10-2022-0172872 filed on Dec. 12, 2022 and Korean Patent Application No. 10-2023-0174803 filed on Dec. 5, 2023, in the Korean Intellectual Property Office (KIPO), the entire contents of which are incorporated herein by reference.

BACKGROUND

1. Field

The following description relates to a method and system for authenticating user content.

2. Description of Related Art

With the advent of generative artificial intelligence (GAI), the number of online contents is expected to increase rapidly. The issue lies in that the number of contents using artificial intelligence rather than the number of contents directly produced by users is rapidly increasing. This may pose a long-term threat to many related parties, for example, content publishers and online service users using information of comments or purchase reviews. In particular, some contents are more important to be written by real people, such as journalism and user reviews. For example, the proportion of contents directly created by persons on a company's site or service may act as a competitive advantage for the corresponding site or service.

Therefore, there may be separate markets for GAI-based created content and user-directly-created content. A higher preference or value may be granted to content created by a real user rather than GAI-created content, which may be especially important in a service, such as e-commerce. Therefore, service providers and content publishers need to be able to separately prove and manage that their contents are created by users or related parties, not by GAI.

Also, there is a need to be able to support a user in creating content in an easier manner through collaboration with GAI. For example, new methods may emerge, such as a GAI service for product reviews and a method of writing voice reviews in a question-and-answer form and posting or publishing the same in a form of reviews. Although this type of review is written by a user with the help of GAI, the review reflects the user's opinion and accordingly, may be used as review information.

SUMMARY

Example embodiments provide a method and system for authenticating user content.

According to an example embodiment, there is provided a user content authentication method of a computer device including at least one processor, the user content authentication method including authenticating, by the at least one processor, a user that desires to create user content; verifying, by the at least one processor, that the user is directly writing the user content; and creating, by the at least one processor, authentication information on the user content created by the user when it is verified that the user is directly writing the user content.

According to an aspect, the verifying that the user is directly writing the user content may include periodically or aperiodically creating a query for checking a creation status of the user content based on re-authentication information created for the user and providing the created query to the user; and verifying that the user is directly writing the user content based on a response of the user to the query.

According to another aspect, the verifying that the user is directly writing the user content may include verifying that the user is directly writing the user content based on at least one of a creation speed of the user content of the user, an event occurrence cycle by the user, and a use status of a user content creation tool for creating the user content.

According to still another aspect, the verifying that the user is directly writing the user content may include requesting the user for proof data capable of checking that the user is directly writing the user content; receiving the proof data from the user; and verifying that the user is directly writing the user content based on the proof data.

According to still another aspect, the verifying that the user is directly writing the user content may include analyzing at least one of user input information to a terminal of the user and an image of the user captured through a camera linked to the terminal of the user and verifying that the user is directly writing the user content.

According to still another aspect, the verifying that the user is directly writing the user content may include verifying that the user is directly writing the user content using an artificial intelligence model that outputs a user writing probability for the user content.

According to still another aspect, the verifying that the user is directly writing the user content may include collecting content creation information by utilizing external content or a generative artificial intelligence function for creating the user content; and analyzing the collected content creation information and verifying that the user is directly writing the user content.

According to still another aspect, the content creation information may include at least one of a user input event, contents of the external content, and contents of content created through the generative artificial intelligence function.

According to still another aspect, the authenticating of the user may include creating re-authentication information on a method for re-authenticating the user and a re-authentication cycle based on an application use environment of an application that is installed and running on a terminal of the user; and storing the created re-authentication information.

According to still another aspect, the user content authentication method may further include creating, by the at least one processor, and storing disapproval details related to the user content when it is not verified that the user is directly writing the user content.

According to still another aspect, the verifying that the user is directly writing the user content may include authenticating a generative artificial intelligence model linked to the user; checking requirements for creating collaborative content between the user and the generative artificial intelligence model; requesting the user to create the collaborative content; and relaying and storing information on a query and a response between the user and the generative artificial intelligence model.

According to an example embodiment, there is provided a computer program stored in a computer-readable recording medium to execute the method on a computer device in conjunction with the computer device.

According to an example embodiment, there is provided a computer-readable recording medium storing a computer program to execute the method on a computer device.

According to an example embodiment, there is provided a computer device including at least one processor configured to execute an instruction readable by the computer device, wherein the at least one processor causes the computer device to authenticate a user that desires to create user content, to verify that the user is directly writing the user content, and to create authentication information on the user content created by the user when it is verified that the user is directly writing the user content.

BRIEF DESCRIPTION OF THE DRAWINGS

FIG. 6 illustrates an example of a process of authenticating user-created content according to an example embodiment.

FIG. 8 illustrates an example of a process of creating re-authentication information to inquire about a user authentication and whether additional user content is directly created by a user according to an example embodiment.

FIGS. 10 and 11 illustrate examples of creating content through collaboration with a user GAI model according to an example embodiment.

DETAILED DESCRIPTION

Hereinafter, example embodiments will be described with reference to the accompanying drawings.

A user content authentication system according to the example embodiments may be implemented by at least one computer device. Here, a computer program according to an example embodiment may be installed and executed on the computer device that implements the user content authentication system, and the computer device may perform a user content authentication method according to the example embodiments under control of the executed computer program. The aforementioned computer program may be stored in a computer-readable storage medium to computer-implement the user content authentication method in conjunction with the computer device.

Figure 1:
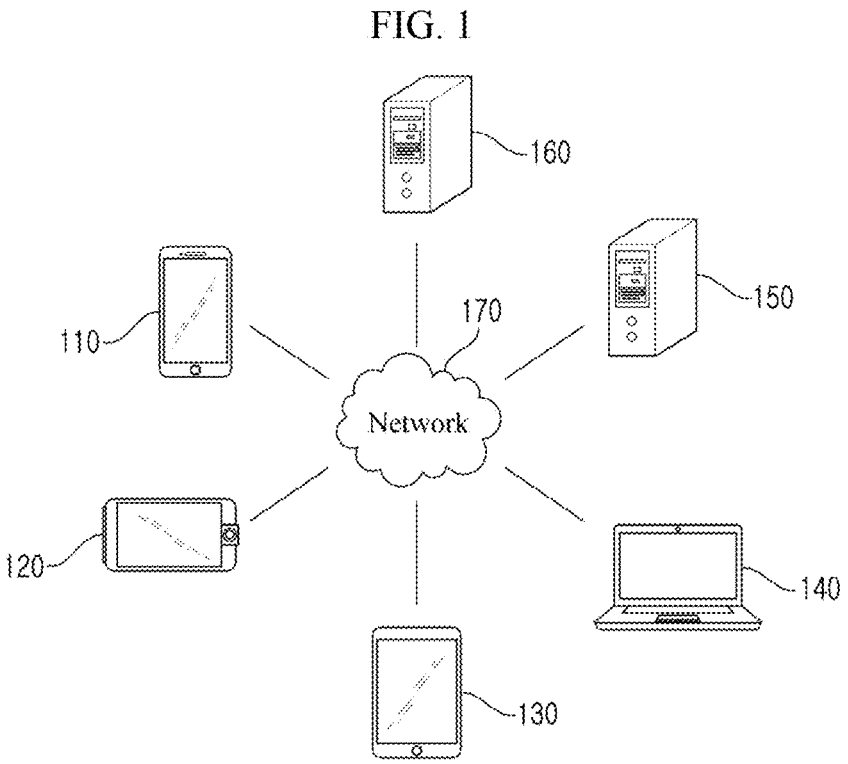
FIG. 1 is a diagram illustrating an example of a network environment according to an example embodiment.

FIG. 1 illustrates an example of a network environment according to an example embodiment. Referring to FIG. 1, the network environment may include a plurality of electronic devices 110, 120, 130, and 140, a plurality of servers 150 and 160, and a network 170. FIG. 1 is provided as an example only and the number of electronic devices is not limited thereto.

Each of the plurality of electronic devices 110, 120, 130, and 140 may be a fixed terminal or a mobile terminal that is implemented as a computer system. For example, the plurality of electronic devices 110, 120, 130, and 140 may be a smartphone, a mobile phone, a navigation device, a computer, a laptop computer, a digital broadcasting terminal, a personal digital assistant (PDA), a portable multimedia player (PMP), a tablet personal computer (PC), a game console, a wearable device, an Internet of things (IoT) device, a virtual reality (VR) device, an augmented reality (AR) device, etc. For example, although FIG. 1 illustrates a shape of a smartphone as an example of the electronic device 110, the electronic device 110 used herein may refer to one of various types of physical computer systems capable of communicating with other electronic devices 120, 130, and 140 and/or the servers 150 and 160 over the network 170 in a wireless or wired communication manner.

The communication scheme is not limited and may include a near field wireless communication scheme between devices as well as a communication scheme using a communication network (e.g., a mobile communication network, wired Internet, wireless Internet, a broadcasting network, and a satellite network) includable in the network 170. For example, the network 170 may include at least one network among networks, such as a personal area network (PAN), a local area network (LAN), a campus area network (CAN), a metropolitan area network (MAN), a wide area network (WAN), a broadband network (BBN), and the Internet. Also, the network 170 may include at least one of network topologies that include a bus network, a star network, a ring network, a mesh network, a star-bus network, a tree or hierarchical network, etc. However, they are provided as examples only.

Each of the servers 150 and 160 may be configured as a computer device or a plurality of computer devices that provides an instruction, a code, a file, content, a service, etc., through communication with the plurality of electronic devices 110, 120, 130, and 140 over the network 170. For example, the server 150 may be a system that provides s first service to the plurality of electronic devices 110, 120, 130, and 140 connected through the network 170 and the server 160 may be a system that provides a second service to the plurality of electronic devices 110, 120, 130, and 140 connected through the network 170. In detail, for example, the server 150 may provide a service (e.g., a search service) desired by a corresponding application to the plurality of electronic devices 110, 120, 130, and 140 as the first service, through the application as the computer program that is installed and executed on the plurality of electronic devices 110, 120, 130, and 140. As another example, the server 160 may provide a file for installation and execution of the application to the plurality of electronic devices 110, 120, 130, and 140 as the second service.

Figure 2:
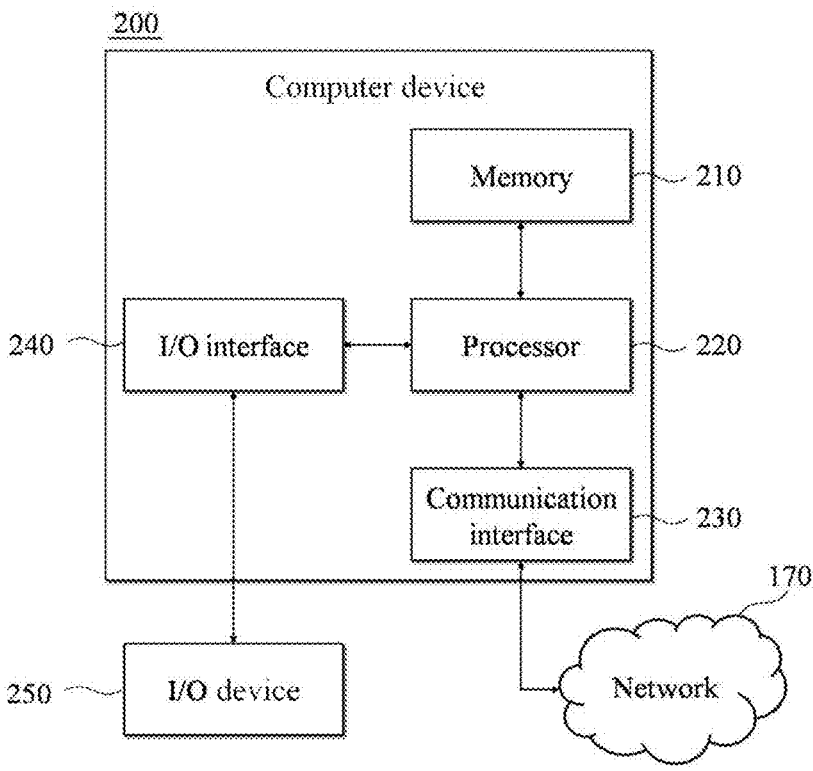
FIG. 2 is a diagram illustrating an example of a computer device according to an example embodiment.

FIG. 2 is a block diagram illustrating an example of a computer device according to an example embodiment. Each of the plurality of electronic devices 110, 120, 130, and 140 or each of the servers 150 and 160 described above may be implemented by a computer device 200 of FIG. 2.

Referring to FIG. 2, the computer device 200 may include a memory 210, a processor 220, a communication interface 230, and an input/output (I/O) interface 240. The memory 210 may include a permanent mass storage device, such as a random access memory (RAM), a read only memory (ROM), and a disk drive, as a computer-readable recording medium. The permanent mass storage device, such as ROM and a disk drive, may be included in the computer device 200 as a permanent storage device separate from the memory 210. Also, an OS and at least one program code may be stored in the memory 210. Such software components may be loaded to the memory 210 from another computer-readable recording medium separate from the memory 210. The other computer-readable recording medium may include a computer-readable recording medium, for example, a floppy drive, a disk, a tape, a DVD/CD-ROM drive, a memory card, etc. According to other example embodiments, software components may be loaded to the memory 210 through the communication interface 230, instead of the computer-readable recording medium. For example, the software components may be loaded to the memory 210 of the computer device 200 based on a computer program installed by files received over the network 170.

The processor 220 may be configured to process instructions of a computer program by performing basic arithmetic operations, logic operations, and I/O operations. The instructions may be provided from the memory 210 or the communication interface 230 to the processor 220. For example, the processor 220 may be configured to execute received instructions in response to the program code stored in the storage device, such as the memory 210.

The communication interface 230 may provide a function for communication between the communication device 200 and another apparatus (e.g., the aforementioned storage devices) over the network 170. For example, the processor 220 of the computer device 200 may deliver a request or an instruction created based on a program code stored in the storage device such as the memory 210, data, and a file, to other apparatuses over the network 170 under control of the communication interface 230. Inversely, a signal, an instruction, data, a file, etc., from another apparatus may be received at the computer device 200 through the network 170 and the communication interface 230 of the computer device 200. For example, a signal, an instruction, data, etc., received through the communication interface 230 may be delivered to the processor 220 or the memory 210, and a file, etc., may be stored in a storage medium (e.g., the permanent storage device) further includable in the computer device 200.

The I/O interface 240 may be a device used for interfacing with an I/O device 250. For example, an input device may include a device, such as a microphone, a keyboard, a mouse, etc., and an output device may include a device, such as a display, a speaker, etc. As another example, the I/O interface 240 may be a device for interfacing with an apparatus in which an input function and an output function are integrated into a single function, such as a touchscreen. The I/O device 250 may be configured as a single apparatus with the computer device 200.

Also, according to other example embodiments, the computer device 200 may include the number of components greater than or less than the number of components shown in FIG. 2. However, there is no need to clearly illustrate many components according to the related art. For example, the computer device 200 may include at least a portion of the I/O device 250, or may further include other components, for example, a transceiver, a database, etc.

Figure 3:
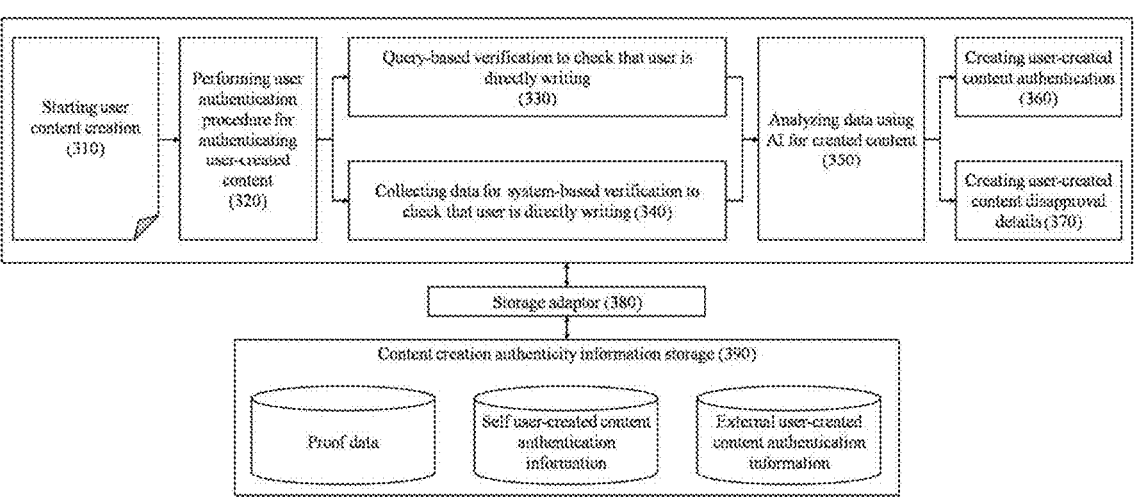
FIG. 3 illustrates an example of a process of checking user user-created content according to an example embodiment.

FIG. 3 illustrates an example of a process of checking user user-created content according to an example embodiment. The process of FIG. 3 may be basically performed by a user content authentication system.

Starting user content creation (310) may represent an action of a user that opens a new document or a template or executes a response with a recording tool, a content authoring application, a web service, a generative artificial intelligence (GAI) agent, etc. Here, if a target application or service requires a user authentication, an authentication process for verifying whether it is created by a corresponding user may be performed.

Performing a user authentication procedure for authenticating user-created content (320) may be an example of a process of performing a user authentication through a corresponding application or service when the user authentication is required or when the user directly desires to perform the authentication. When authentication through a user terminal is possible, the authentication may be performed using each authentication method (e.g., bio-authentication, password-based authentication, etc.) in the case of mobile, Windows, etc. If the application or the service requests a separate method (when the user requests a separate authentication, an authentication procedure is performed according to a corresponding authentication method. Here, when coordinating with an agent on a user terminal, an authentication procedure between the agent and the user may be performed.

A query-based verification to check that the user is directly writing (330) may be an example of a process of performing a query-based verification procedure as one of methods of checking that the user is directly writing in a controllable user content creation application environment. The user content authentication system may perform an inquiry for checking a user content creation status periodically or aperiodically based on a seed value created when the user logs in. Here, the user content authentication system may collectively determine a content creation speed of the user and an event occurrence cycle, a content creation function (use status of tools on content authoring tool) and, if the content creation speed differs from a general user content creation speed, may provide a function for checking the same.

Collecting data for system-based verification to check that the user is directly writing (340) may be an example of a process of requesting proof data collection related to user writing on the user content authentication system to check that the user is directly writing the content. The user content authentication system may request the user for various types of information, for example, a user input or image and sound based on characteristic information of a terminal being used by the user. Also, in addition to a single user authentication method, another user authentication method not attempted may be requested. For example, when the user quickly creates content at a time using cut and paste, it may need to be detected and controllable through a user query. Therefore, if the user creates content faster than an average speed, the user content authentication system may activate a camera function of a web cam to monitor this situation or may collect user input information and record related information based on user consent. Corresponding information may be used to check whether content is directly created by ana- lyzing the user input information or by using user gaze tracking technology. In the case of creating content online based on content, such as an offline note, the user may capture information on offline content (memo, sketch, etc.), may upload the information to the user content authentication system, and may use the same to verify directness and originality of content creation.

Analyzing data using AI for created content (350) may be an example of a process of performing an additional analysis based on a user writing probability through user pattern and large-scale learning information by additionally using AI to verify user-created content. This may be applied to a variety of information, for example, an image and a video, as well as text, and the user content authentication system may check authenticity of corresponding data through linkage to an external AI service. Also, the user-created content may be reviewed using AI watermark information.

Creating user-created content authentication (360) may be an example of a process of separately storing and managing corresponding information on content and the user content authentication system when the user-created content is authenticated. The stored user-created content may be used in connection to a user account. When linked to content, user-created content authentication may be created in a form of a separate watermark on the content. As another example embodiment, the user content authentication system may provide an authentication function of user-created content in a form of a certificate. Also, if necessary, the user content authentication system may create and provide authentication for the user-created content in conjunction with a separate token system. Also, the authenticated user-created content may be used as a separate differentiated service.

Creating user-created content disapproval details (370) may be an example of a process of separately creating and notifying a user of reason for disapproval for content that is disapproved as user-created content, that is, that fails in authentication and separately storing and managing a corresponding recording. Depending on user objection, deliberation may be conducted in an automated or non-automated manner and corresponding results may be updated. Automated methods generally relate to analysis through AI and non-automated analysis may be conducted by configuring a separate deliberation committee.

A variety of information may be stored in a content creation authenticity information storage 390 through a storage adaptor 380.

Figure 4:
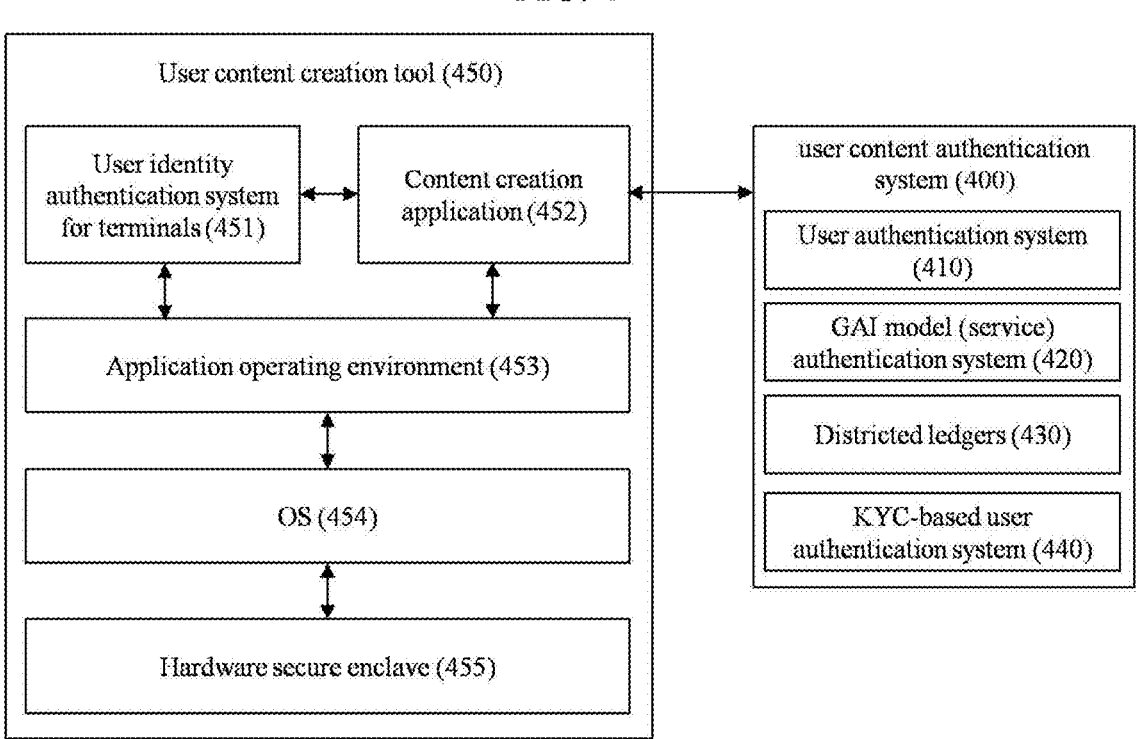
FIG. 4 illustrates an example of a user content authentication system linked to a content creation tool according to an example embodiment.

FIG. 4 illustrates an example of a user content authentication system linked to a content creation tool according to an example embodiment. A user content authentication system 400 of FIG. 4 may include a user authentication system 410, a GAI model (service) authentication system 420, districted ledgers 430, and a know your customer (KYC)-based user authentication system 440. A user content creation tool 450 may include a user identity authentication system for terminals 451, such as an electronic wallet, a one-time password (OTP), and an open authorization (OAuth), a content creation application 452 including GAI, an application operating environment 453, such as browser and an application, an operating system (OS) 454, such as Android, Windows, and iOS, and a hardware secure enclave 455, such as a secure enclave processor and a key storage.

Here, the user content creation tool 450 may interwork with the user content authentication system 400 to have a user creation authentication function in advance. The user content creation tool 450 may provide all functions in an installation form as well as in an API form to provide a function for an online mode or a non-real-time verification and this form may provide a sandbox-type security function. Also, authentication may be performed using an account, such as KYC-based external wallet capable of authenticating a user's identity. In the case of an authenticated user, an identity authentication procedure may be performed using a function, such as secure enclave of a terminal during a subsequent user authentication. Also, authentication may be performed without using a network connection function each time by using an offline environment or a periodic user status check in a content creation process. Also, if user information and authentication are provided for a GAI model (a voice assistant, a GAI model-based tool) that operates in a user terminal, a response value from the corresponding GAI model may be recognized as a portion of content created by the user.

Figure 5:
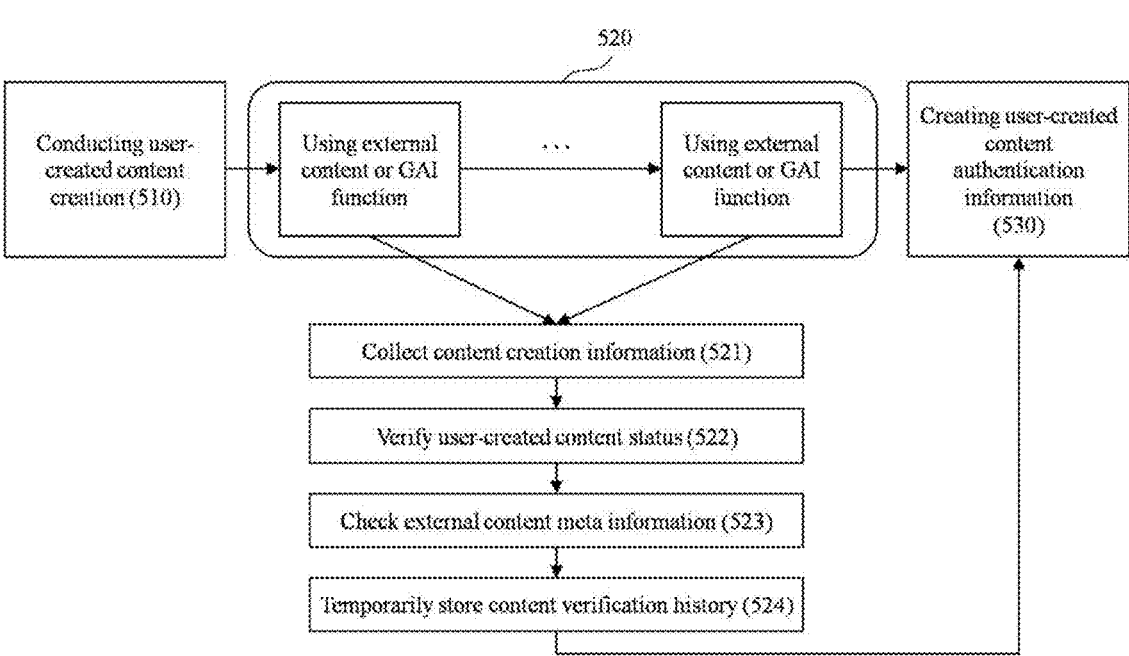
FIG. 5 illustrates an example of a process of verifying a user-created content status according to use of external content according to an example embodiment.

FIG. 5 illustrates an example of verifying a user-created content status according to use of external content according to an example embodiment. A user may use external content in a process in which the user directly creates content, or may use a GAI function provided from a corresponding service and/or application. Here, by collecting information on use of the external content that is not directly created by the user and by managing history in a creation process, a final user-created content status and other aspects may be determined when performing a user-created content authentication in the future.

Here, the example embodiment of FIG. 5 shows that operations 521 to 524 may be performed when a process of using external content or GAI (520) proceeds after conducting user-created content creation (510). Operations 521 to 524 may be performed through linkage between the user content authentication system 400 and the user content creation tool 450, but is described below as being performed simply by the user content authentication system 400.

In operation 521, the user content authentication system 400 may collect content creation information. For example, when the user creates content using cut and paste, import, an external content adaptor, etc., an application or a service may monitor corresponding information and may transmit the information to a module for collecting user-created content information. The module may be, for example, a module of the user content authentication system 400.

In operation 522, the user content authentication system 400 may verify a user-created content status. Verifying the user-created content status may be performed based on event and content contents on the corresponding service. For example, in the case of cut and paste, the user content authentication system 400 may check whether the contents is in the same document and, when duplication of the same phrase occurs, may check whether the duplicated phrase is created by the user based on source information of an original phrase. In the case of cutting and pasting the external content, the user content authentication system 400 may request a function of verifying a uniform resource locator (URL) or a content identifier (CID) of the external content, content metadata (e.g., content authenticity initiative (CAI)), etc., along with a user notification, or may interwork on the service. In the case of importing external data, the user content authentication system 400 may determine a user-created content status based on reliable metadata related to user-created information.

In operation 523, the user content authentication system 400 may check external content meta information. When identifiable metadata information is present in the external content, the user content authentication system 400 may check the corresponding information and store the same for separate management.

In operation 524, the user content authentication system 400 may temporarily store a content verification history. When identifiable metadata information is present in the external content, the user content authentication system 400 may check the corresponding information and store the same for separate management.

Then, the user content authentication system 400 may create user-created content authentication information (530) through the collected data and verification results.

FIG. 6 illustrates an example of a process of authenticating user-created content according to an example embodiment. When an item purchase of a user is completed or delivery is completed (610), the user may be requested to unpack a corresponding product or write a review on a service or a product being used (620). Here, the user may search for a terminal capable of authenticating the user around the user (630). In this case, the user may perform an identity authentication using a device capable of authenticating the user identity among terminals present around the user. For example, a PC or a mobile may authenticate the user using the existing methods, such as an ID and a password, an OTP, and a biometric authentication. As another example, the user may be authenticated based on voice recognition using a smart speaker. Here, the user authentication may be checked using a device or an application preferred by the user among devices around the user (640). For example, among devices around the user, a device having the same network information or previously authenticated by the user may not require a separate additional authentication. However, a device that has never been registered may require a separate additional authentication.

Then, the user may write user-created content (650). The user may create content using various devices around the user. For example, the user may receive data using a plurality of devices and may create and edit content based on the data. In detail, for example, in the case of product unpacking, the user may create content in a form of combining voice recognition and a photo. Here, when the user writes a review or an evaluation based on history of the purchased product, the user content authentication system 400 may authenticate user-created content using purchase information on the corresponding product. In this case, the user content authentication system 400 may check authentication information from information of the terminal and an individual application of the user-created content (660). To check authentication information in the future, the user content authentication system 400 may separately store the checked authentication information. Here, the user content authentication system 400 may store the checked authentication information using its own storage or separate ledgers (e.g., districted ledgers 430). Then, the user content authentication system 400 may complete creation of user-created content authentication information (670). The authentication information may be provided in a form of an API to be providable to a separate external service. Also, the authentication information may be issued in a form of non-fungible token (NFT) for the corresponding content.

Figure 7:
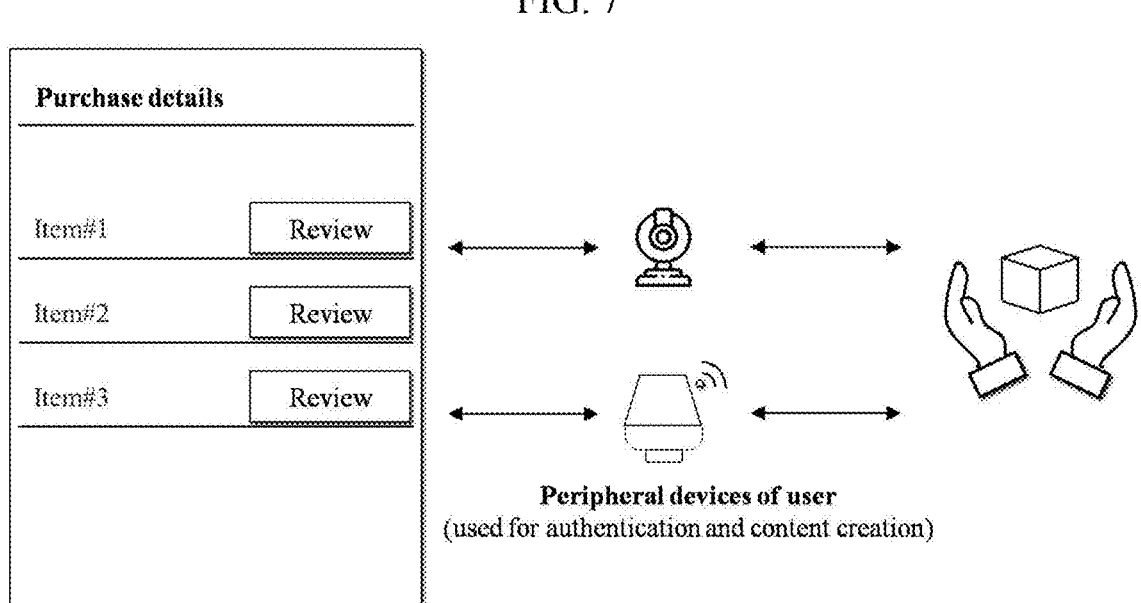
FIG. 7 illustrates an example of creating user-created content associated with a user purchase history according to an example embodiment.

FIG. 7 illustrates an example of creating user-created content associated with a user purchase history according to an example embodiment. A user may create content on an application or a service used by the user and, when purchasing a specific product, such as e-commerce, may create user content through connection to corresponding product purchase details. While content is created according to a form that is provided from a corresponding application or service in the art, the example embodiment may support various multi-modal inputs through connection to peripheral devices of the user. Through this, the user may create content that reflects vivid user experiences and real reviews and a system that manages the user-created content may improve reliability and usability for the content based on user authentication information that is created and provided from the user content authentication system 400. Also, in this process, incentives for creating additional content may be provided to the user using purchase details when creating user-created content. When creating the user-created content, the user's peripheral device may be present within the same network or needs to have a characteristic of a device authenticated by the user. Otherwise, a separate additional procedure may be performed. For example, if a web cam does not use the same WIFI SSID, an additional process, such as a user verification using facial information of created content, may be performed.

FIG. 8 illustrates an example of a process of creating re-authentication information to inquire about a user authentication and whether additional user content is directly created by a user according to an example embodiment.

Requesting user content creation (810) may be an example of a process of requesting creation of user content through a terminal of a user when the user desires to directly create content. An environment in which the user may create content may include devices, for example, an existing PC, a mobile, a tablet, and a smart TV, and may include an environment capable of recording the user's voice using a microphone or the user's image or the user's direct control experiences depending on example embodiments. For example, upon completion of delivery of a product, an unpacking process of the product may be filmed using a home closed circuit television (CCTV), a smart speaker, a smart TV including a camera, a tablet, and a web cam and, in this process, a user content creation request for checking whether the corresponding content is directly created by the user may be transmitted to the user content authentication system 400.

A user authentication request 820 may be transmitted from the user content creation tool 450 to the user content authentication system 400. For example, the user may directly request user authentication through a specific application. Here, the user may request the authentication in a multi-modal form, such as the user's voice, the user's face, and/or iris, using at least one of a plurality of devices around the user.

Checking user information (830) may be an example of a process of checking user information in the user content authentication system 400. For example, the user content authentication system 400 may check the user information through the user authentication system 410. In the case of an initial authentication, the user content authentication system 400 may perform a user authentication based on a service grade. When a KYC-based real name authentication is required, the user content authentication system 400 may check information for the user authentication through the KYC-based user authentication system 440. If the user is not authenticated since the user information is not checked, the process of the user authentication request 820 may be performed again.

Checking user application and application operating terminal information (840) may be an example of a process in which the user content authentication system 400 checks an application used for the user to create the content and an operating environment of the application. The user content authentication system 400 may use information on the application and the operating environment of the application as information used to determine an authentication method, such as a user re-authentication cycle and offline mode support.

Creating user re-authentication information (850) may be an example of a process in which the user content authentication system 400 creates a random cycle number for a user re-authentication method and cycle based on a user application use environment and creates re-authentication information. Here, the re-authentication information may correspond to the aforementioned seed. Even in an online environment, information on an authentication method and cycle, time, etc., for minimal offline correspondence may be created together and may correspond to a change in a network status of the terminal in the future.

Storing user authentication information and re-authentication trigger information (860) may be an example of a process in which the user content authentication system 400 stores user authentication status information and re-authentication trigger information in a server and a terminal environment, respectively, if necessary. Here, the server may represent a system that provides a service through which the user desires to upload user-created content.

Figure 9:
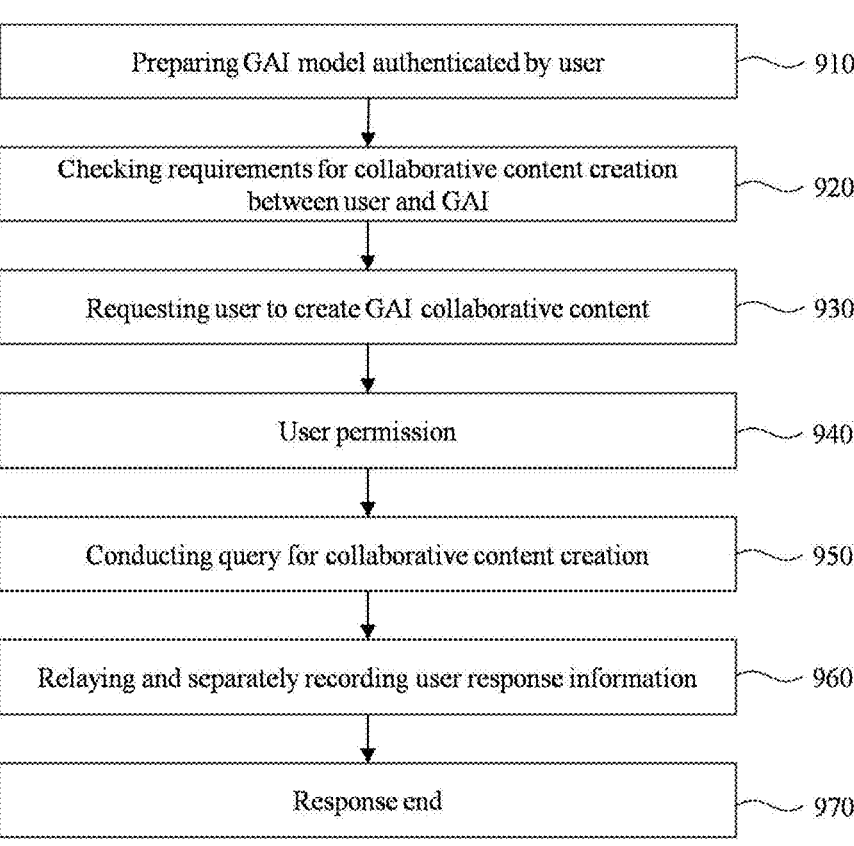
FIG. 9 illustrates an example of an authentication process for content creation through collaboration with a user generative artificial intelligence (GAI) model according to an example embodiment.

FIG. 9 illustrates an example of an authentication process for content creation through collaboration with a user GAI model according to an example embodiment.

Preparing a GAI model authenticated by a user (910) may be an example of a process in which the user content authentication system 400 authenticates the GAI model of the user. On a user terminal or a user service, a GAI-based model authenticated by the user may be used as a corresponding target. For example, a service, such as Siri on iOS, "Hey Google" on Android, and Bixby, may be the GAI model, and a personalized GAI model not only on a terminal but also on a specific service may be the corresponding target. Here, the GAI model needs to be authenticated by the user and to be capable of checking user authentication information from the outside.

Checking requirements for collaborative content creation between the user and GAI (920) may be an example of a process in which the user content authentication system 400 checks the requirements for creating collaborative content. Services that desire to use user content may suggest, to the user, requirements information used to create collaborative content with the user. Here, a suggestible service or application needs to be a service installed in advance on a user terminal or connected to a wallet of the user terminal and, here, prior permission (approval) from a relevant user may be required. Such suggested services may provide additional points and service benefits in return. A corresponding request may be made to the GAI model of the user through a separate service request pool, which may lead to causing separate cost.

Requesting the user to create GAI collaborative content (930) may be an example of a process in which the user content authentication system 400 requests the user to create content through collaboration with the GAI model. A collaborative content creation request may be created in real time and may basically have temporal constraints or restrictions on the number of queries. For example, a collaborative content creation request related to product purchase may include 1) a request for a user response for a purchase confirmation stage and 2) a request for a query and a response for the user's opinion at a specific point in time, such as upon completion of delivery, one week after use, and one month after use, for product reviews. As another example, when making a reservation at a specific hotel or restaurant or when visiting a corresponding location, a related collaborative content creation request may be provided to the user. Here, a user response suitable for the corresponding location, such as check-in, atmosphere, and price, may be requested. Also, information may be provided to the user to request an access to user photo information, such as food photos and space photos, and/or to request providing of information excluding privacy.

User permission (940) may be an example of a process in which the user content authentication system 400 receives a permission from the user in response to the collaborative content creation request. The user may permit the service through an agent of the terminal and direct approval, such as a user touch and authentication, as well as voice may also be used for the permission. Here, if the terminal is locked to firmly determine a user acceptance status, the user authentication may be performed through a user authentication method supported by the terminal.

Conducting a query for collaborative content creation (950) may be an example of a process in which the user content authentication system 400 conducts a query for creating collaborative content through the GAI model. The query for creating the collaborative content may be conducted and the query may be received from a remote service (e.g., a service that provides the corresponding GAI model). Here, to authenticate received information, whether the query is normal may be determined through connection to authentication information of the application installed on the user terminal.

Relaying and separately recording user response information (960) may be an example of a process in which the user content authentication system 400 relays or separately records the user response information through the GAI model. Relaying of the user response information may relate to not only simple voice information but also a variety of information accessible by a terminal agent. For example, the user response information relayed may include user location information, user photo information, and user wallet information and, in the case of accessing the corresponding information, the user content authentication system 400 may obtain an additional permission from the user. Also, a separate additional user authentication may be requested for information with a privacy issue in the user response information. The user response information is temporarily stored in a storage in a form of secure enclave, and a period and storage capacity thereof are set by the user content authentication system 400.

Response end (970) may represent end of a query and a response for collaborative content creation. Here, the user content authentication system 400 may store information on a user authentication status and re-authentication triggering information in a server and a terminal environment, respectively, if necessary.

FIGS. 10 and 11 illustrate examples of creating content through collaboration with a user GAI model according to an example embodiment. FIG. 10 illustrates an example of a process in which a GAI agent on a terminal receives a request from a service application and checks whether user-creative content is written. FIG. 11 illustrates an example of a process in which the GAI agent on the terminal mediates a response from the service application.

Figure 12:
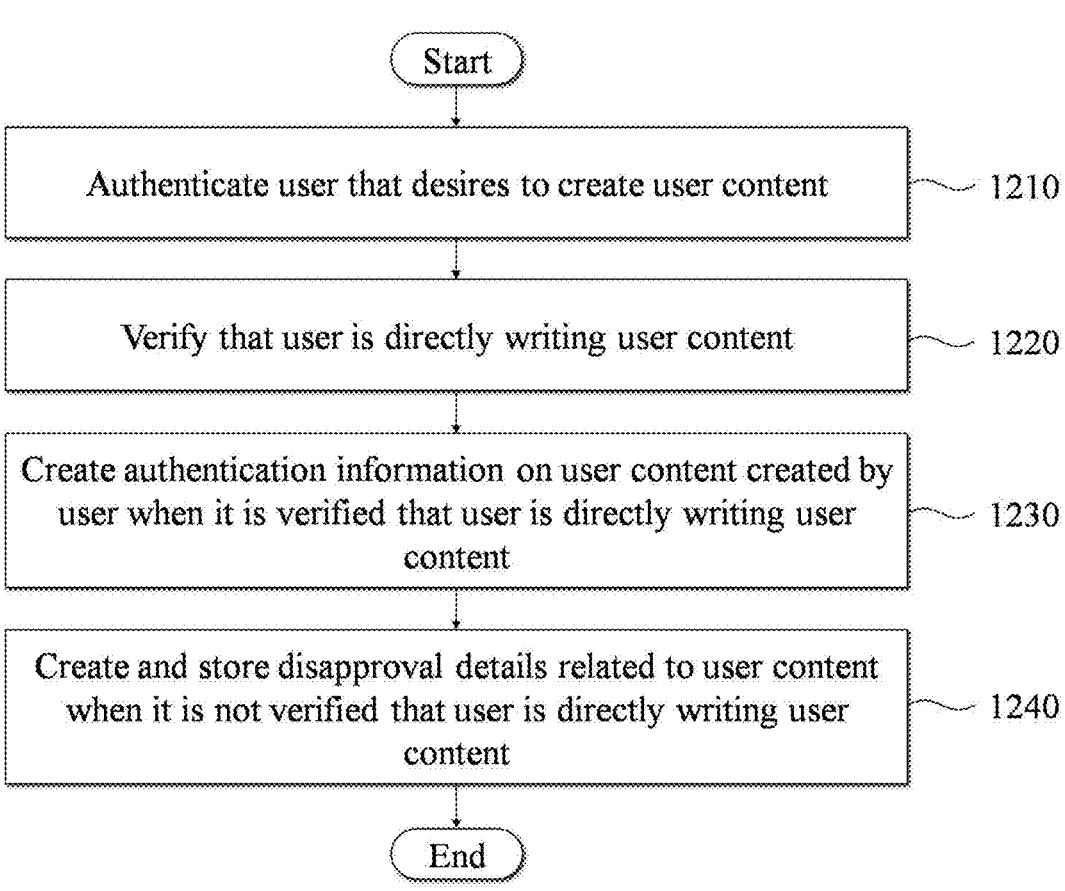
FIG. 12 is a flowchart illustrating an example of a user content authentication method according to an example embodiment.

FIG. 12 is a flowchart illustrating an example of a user content authentication method according to an example embodiment. The user content authentication method according to the example embodiment may be performed by the computer device 200 that implements the user content authentication system 400. In this case, the processor 220 of the computer device 200 may be implemented to execute a control instruction according to a code of an OS included in the memory 210 or a code of at least one computer program. Here, the processor 220 may control the computer device 200 to perform operations 1210 to 1240 included in the method of FIG. 12 according to a control instruction provided from the code stored in the computer device 200.

In operation 1210, the computer device 200 may authenticate a user that desires to create user content. Here, the computer device 200 may create re-authentication information on a method for re-authenticating the user and a re-authentication cycle based on an application use environment of an application that is installed and runs on a terminal of the user and may store the created re-authentication information. The re-authentication information may be used to determine the user re-authentication method and the re-authentication cycle in the future.

In operation 1220, the computer device 200 may verify that the user is directly writing the user content.

In an example embodiment, the computer device 200 may periodically or aperiodically create a query for checking a creation status of the user content based on re-authentication information created for the user and may provide the created query to the user. In this case, the computer device 200 may verify that the user is directly writing the user content based on a response of the user to the query.

In another example embodiment, the computer device 200 may verify that the user is directly writing the user content based on at least one of a creation speed of the user content of the user, an event occurrence cycle by the user, and a use status of a user content creation tool for creating the user content.

In still other example embodiments, the computer device 200 may request the user for proof data capable of checking that the user is directly writing the user content. In this case, the computer device 200 may receive the proof data from the user and may verify that the user is directly writing the user content based on the proof data.

In still another example embodiment, the computer device 200 may analyze at least one of user input information to a terminal of the user and an image of the user captured through a camera linked to the terminal of the user and may verify that the user is directly writing the user content. The image of the user may be analyzed based on user gaze tracking technology.

In still another example embodiment, the computer device 200 may verify that the user is directly writing the user content using an artificial intelligence model that outputs a user writing probability for the user content.

In still another example embodiment, the computer device 200 may collect content creation information by utilizing external content or a generative artificial intelligence function for creating the user content. In this case, the computer device 200 may analyze the collected content creation information and may verify that the user is directly writing the user content. Here, the content creation information may include at least one of a user input event, contents of the external content, and contents of content created through the generative artificial intelligence function.

In still another example embodiment, the computer device 200 may authenticate a generative artificial intelligence model linked to the user and may check requirements for creating collaborative content between the user and the generative artificial intelligence model. In this case, the computer device 200 may request the user to create the collaborative content and may relay and store information on a query and a response between the user and the generative artificial intelligence model. Then, the computer device 200 may verify that the user is directly writing the user content based on information on the query and the response.

In operation 1230, when it is verified that the user is directly writing the user content, the computer device 200 may create authentication information on the user content created by the user.

In operation 1240, when it is not verified that the user is directly writing the user content, the computer device 200 may create and store disapproval details related to the user content.

Description omitted in relation to FIG. 12 may refer to the aforementioned description of FIGS. 3 to 11.

As described above, according to example embodiments, there may be provided a method and system for authenticating user content.

The systems or the apparatuses described herein may be implemented using hardware components or combinations of hardware components and software components. For example, the apparatuses and the components described herein may be implemented using one or more general-purpose or special purpose computers, such as, for example, a processor, a controller, an arithmetic logic unit (ALU), a digital signal processor, a microcomputer, a field programmable gate array (FPGA), a programmable logic unit (PLU), a microprocessor, or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will be appreciated that the processing device may include multiple processing elements and/or multiple types of processing elements. For example, the processing device may include multiple processors or a processor and a controller. In addition, different processing configurations are possible, such as parallel processors.

The software may include a computer program, a piece of code, an instruction, or some combinations thereof, for independently or collectively instructing or configuring the processing device to operate as desired. Software and/or data may be embodied in any type of machine, component, physical equipment, virtual equipment, a computer storage medium or device, to be interpreted by the processing device or to provide an instruction or data to the processing device. The software also may be distributed over network coupled computer systems so that the software is stored and executed in a distributed fashion. The software and data may be stored by one or more computer readable storage media.

The methods according to the above-described example embodiments may be configured in a form of program instructions performed through various computer devices and recorded in computer-readable media. The media may include, alone or in combination with the program instructions, data files and data structures. Here, the media may continuously store computer-executable programs or may temporarily store the same for execution or download. Also, the media may be various types of recording devices or storage devices in a form in which one or a plurality of hardware components are combined and may be present over a network in a distributed manner without being limited to media directly connected to a computer system. Examples of the media include magnetic media such as hard disks, floppy disks, and magnetic tapes; optical media such as CD-ROM and DVDs; magneto-optical media such as floptical disks; and hardware devices that are specially configured to store program instructions, such as read-only memory (ROM), random access memory (RAM), flash memory, and the like. Examples of other media may include recording media and storage media managed by an app store that distributes applications or a site, a server, and the like that supplies and distributes other various types of software. Examples of the program instructions include a machine language code produced by a compiler and an advanced language code executable by a computer using an interpreter.

While the example embodiments are described with reference to specific example embodiments and drawings, it will be apparent to one of ordinary skill in the art that various alterations and modifications in form and details may be made in these example embodiments without departing from the spirit and scope of the claims and their equivalents. For example, suitable results may be achieved if the described techniques are performed in a different order, and/or if components in a described system, architecture, device, or circuit are combined in a different manner, or replaced or supplemented by other components or their equivalents.

Therefore, other implementations, other example embodiments, and equivalents of the claims are to be construed as being included in the claims.

What is claimed is:

1. A user content authentication method of a computer device comprising at least one processor, the user content authentication method comprising:

authenticating, by the at least one processor, a user that desires to create user content;

verifying, by the at least one processor, that the user is directly writing the user content; and creating, by the at least one processor, authentication information on the user content created by the user when it is verified that the user is directly writing the user content, wherein the verifying that the user is directly writing the user content comprises verifying that the user is directly writing the user content based on at least one of a creation speed of the user content of the user, an event occurrence cycle by the user, and a use status of a user content creation tool for creating the user content.

2. The user content authentication method of claim 1, wherein the verifying that the user is directly writing the user content comprises:

requesting the user for proof data capable of checking that the user is directly writing the user content;

receiving the proof data from the user; and verifying that the user is directly writing the user content based on the proof data.

3. The user content authentication method of claim 1, wherein the verifying that the user is directly writing the user content comprises analyzing at least one of user input information to a terminal of the user and an image of the user captured through a camera linked to the terminal of the user and verifying that the user is directly writing the user content.

4. The user content authentication method of claim 1, wherein the verifying that the user is directly writing the user content comprises verifying that the user is directly writing the user content using an artificial intelligence model that outputs a user writing probability for the user content.

5. The user content authentication method of claim 1, wherein the verifying that the user is directly writing the user content comprises:

collecting content creation information by utilizing external content or a generative artificial intelligence function for creating the user content; and analyzing the collected content creation information and verifying that the user is directly writing the user content.

6. The user content authentication method of claim 5, wherein the content creation information includes at least one of a user input event, contents of the external content, and contents of content created through the generative artificial intelligence function.

7. The user content authentication method of claim 1, further comprising:

creating, by the at least one processor, and storing disapproval details related to the user content when it is not verified that the user is directly writing the user content.

8. A computer-readable recording medium storing a computer program to execute the method of claim 1 on the computer device.

9. A user content authentication method of a computer device comprising at least one processor, the user content authentication method comprising:

authenticating, by the at least one processor, a user that desires to create user content; verifying, by the at least one processor, that the user is directly writing the user content; and creating, by the at least one processor, authentication information on the user content created by the user when it is verified that the user is directly writing the user content, wherein the authenticating of the user comprises:

creating re-authentication information on a method for re-authenticating the user and a re-authentication cycle based on an application use environment of an application that is installed and running on a terminal of the user; and storing the created re-authentication information.

10. A user content authentication method of a computer device comprising at least one processor, the user content authentication method comprising:

authenticating, by the at least one processor, a user that desires to create user content; verifying, by the at least one processor, that the user is directly writing the user content; and creating, by the at least one processor, authentication information on the user content created by the user when it is verified that the user is directly writing the user content, wherein the verifying that the user is directly writing the user content comprises:

authenticating a generative artificial intelligence model linked to the user;

checking requirements for creating collaborative content between the user and the generative artificial intelligence model;

requesting the user to create the collaborative content; and relaying and storing information on a query and a response between the user and the generative artificial intelligence model.

* * * * *